Aug. 18, 1959     T. F. McHENRY ET AL     2,900,593
ELECTRIC GENERATOR REGULATING SYSTEM

Filed Feb. 16, 1955     2 Sheets-Sheet 1

INVENTORS.
THOMAS F. McHENRY
JOSEPH J. GRABINSKI
BY
*James and Franklin*
ATTORNEYS Aug. 18, 1959  T. F. McHENRY ET AL  2,900,593
ELECTRIC GENERATOR REGULATING SYSTEM
Filed Feb. 16, 1955  2 Sheets-Sheet 2

INVENTOR.
THOMAS F. McHENRY
JOSEPH J. GRABINSKI
BY
ATTORNEYS

United States Patent Office 2,900,593
Patented Aug. 18, 1959

2,900,593

ELECTRIC GENERATOR REGULATING SYSTEM

Thomas F. McHenry, New Canaan, and Joseph J. Grabinski, Meriden, Conn., assignors to Electric Regulator Corporation, Norwalk, Conn., a corporation of New York Application February 16, 1955, Serial No. 488,558

16 Claims. (Cl. 322—24)

The present invention relates to improvements in regulating systems designed to control a given circuit parameter, for example, voltage or current, so that optimum control conditions are achieved and failure of certain of the controlling instrumentalities will affect the controlled parameter either minimally or not at all.

It is common in control systems of the type under discussion to sense the parameter involved, such as the voltage across a line, and to control an impedance in accordance with such sensing, the impedance being operatively connected to the circuit in such a way as to cause the parameter to vary in an appropriate manner. For example, when an alternator generates a voltage which is fed to a line leading to a load, the line voltage will tend to vary according to the condition of the load. By sensing the actual voltage across the line and by varying the energization of the field of the alternator in accordance therewith, a substantially constant line voltage can be provided independent of the instantaneous load condition. While many instruments are available which are capable of thus varying the alternator field energization by changing the value of an impedance, usually a resistance, connected in series with that field, and while the present invention is not specifically limited to the use of any one type of such instruments, it is here specifically disclosed in connection with the use of an electromagnetically actuated finger-type control instrument such as that disclosed in Cohen Patent 2,650,957.

A control system must be designed to correspond to the operating characteristics of the instrumentalities with which it is employed. Specifically, the sensitivity and speed of response of the control system per se must be carefully correlated with the inherent speed of response of the overall system being regulated. If the control system per se is insufficiently sensitive, large error may occur without the control sensing the departure of the parameter from its nominal value and restoring the parameter to its nominal value. Accordingly it is fairly conventional, where the basic parameter sensing device does not have sufficient sensitivity, to employ auxiliary sensing devices which, in conjunction with the basic device, increase the overall gain of the sensing system.

However, if that gain is increased too greatly in comparison with the response characteristics of the overall system being regulated, an equally undesirable result obtains. The regulating system overcontrols, and hunting results. Sometimes that hunting will damp itself out, but even then an excessive long period of time is involved before the parameter being regulated attains a stable value. In some circumstances the hunting is self-sustaining, an obviously impermissible situation.

Therefore the gain of the sensing system must not depart much, if at all, from that optimum gain which, in conjunction with the response characteristics of the overall system, results in a servo loop having proper dynamic characteristics.

In some instances a control system having variable gain is most desirable. Where the control parameter suddenly departs radically from its nominal value, the control system should act strongly to return it to that nominal value, and this is facilitated by a high gain sensing arrangement. However, once the parameter has been brought close to its nominal value the overall gain of the sensing system should automatically decrease in order to prevent hunting.

When more or less complex regulating systems are devised to take care of the problems set forth above, those systems are dependent for proper functioning upon the continued proper operation of the various gain-producing instrumentalities employed. In many instances those instrumentalities take the form of electron tubes, which are notoriously subject to malfunction. A major drawback to the use of such systems has therefore been their essential unreliability. This factor looms large particularly in the design of regulating systems for use in military applications, where the maintenance of voltage at a predetermined value under the most adverse conditions is essential if other equipment relying upon that voltage, such as airborne radar, is to function properly.

The present invention has as its prime object the provision of a regulating system the sensitivity or gain control and speed of response of which can be closely correlated with the appropriate characteristics of the system being controlled. Hence the control parameter of the latter system can be held closely at its nominal value under all load conditions and with the greatest overall speed of response consistent with the system being controlled. Auxiliary parameter sensing equipment is employed for this purpose. In addition, the system is so designed that should portions of this auxiliary sensing equipment become disabled, the overall regulating system will still function in an acceptable manner, although with some loss of sensitivity, the disabled system being capable of maintaining the controlled parameter either at its nominal value or else not too far removed therefrom.

To that end the impedance-varying instrument which controls the value of the parameter in question is electromagnetically actuated by means of a plurality of actuating coils, and at least one of those coils is energized by a gain-producing parameter-sensing instrumentality. A normally non-active element is connected across the gain-producing instrumentality. That element, here specifically disclosed as a conventional voltage regulator tube, is sensitive to the voltage across the instrumentality and will pass current only when the voltage across the instrumentality exceeds a predetermined value. This will occur when the instrumentality is improperly functioning or not functioning at all, the element thus constituting a safety device permitting the overall system to continue to operate in a satisfactory manner even upon failure of the instrumentality. The voltage across the instrumentality may also exceed its nominal value if the parameter being sensed should depart from its nominal value to an excessive degree. In such an event current will flow through both the instrumentality and the element, the electromagnet actuating coil will carry a current in excess of that permitted by the instrumentality acting alone, and consequently the regulating device will in effect have its sensitivity increased, at least until the parameter being controlled approaches its nominal value more closely. When the latter event occurs the element will no longer be active, and the system will resume its normal mode of action.

In the system as thus far described failure of the gain-producing instrumentality, which causes the element connected thereacross to become active in the system, will result in the system functioning in a satisfactory manner, but the value at which the parameter is held will depart somewhat from its nominal value. By connecting a third electromagnet-actuating coil in series with the element connected across the gain-producing instrumentality two extremely advantageous results are obtained. First, the effect of that element, when the control parameter departs radically from its nominal value, is intensified, and consequently the overall speed of response of the system is improved. Second, if the gain-producing instrumentality should malfunction or become disabled, the system can be so designed that consequent actuation of the element connected across that instrumentality will result in maintenance of the control parameter exactly at its nominal value, the system suffering only a measurable but not inadmissible loss in speed of response.

Systems constructed according to the teachings of the present invention will, therefore, when all parts thereof are functioning properly, produce better regulation than previous systems, and will be particularly reliable because they will continue to function in a satisfactory manner even though portions of them should become inoperative.

To the accomplishment of the above, and to such other objects as may hereinafter appear, the present invention relates to the details of a regulating system as set forth in the appended claims and as described in this specification, taken together with the accompanying drawings in which:

Figure 1:
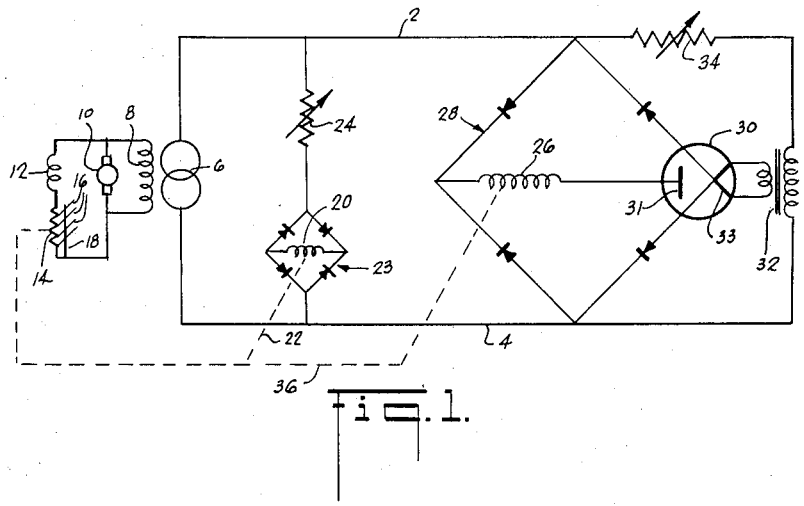
Fig. 1 is a circuit drawing of a regulating system including primary and auxiliary parameter-sensing arrangements, the auxiliary sensing arrangement being designed to produce a predetermined degree of gain, the circuit of Fig. 1 being representative of known control systems.
Figure 2:
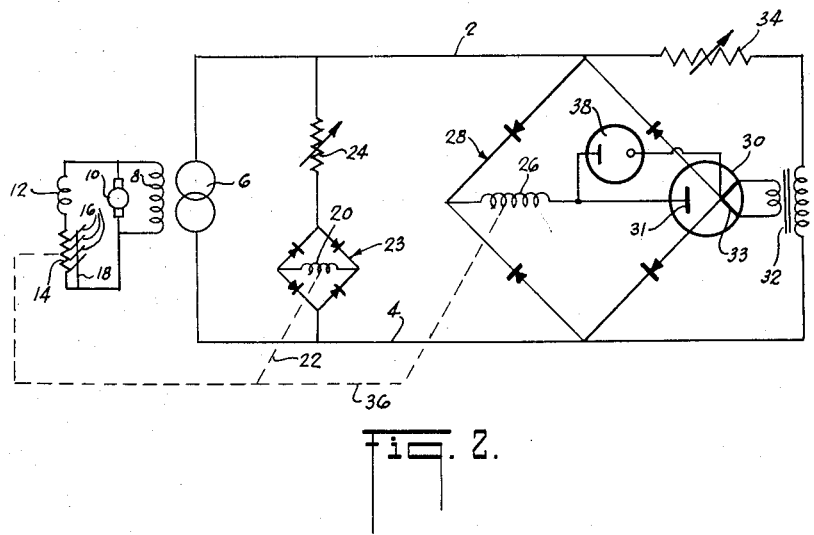
Fig. 2 is a circuit diagram of a system similar to Fig. 1 modified according to the teachings of the present invention, a normally non-acting element being connected across the gain-producing instrumentality.
Figure 3:
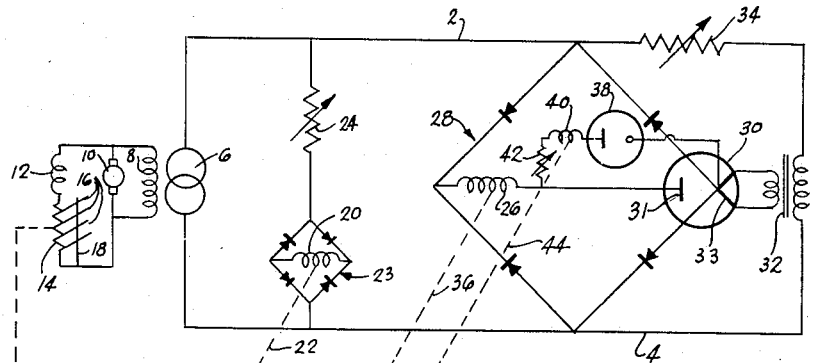
Fig. 3 is a circuit diagram similar to Fig. 2 but in which an electromagnet-actuating coil is connected in series with the element connected across the gain-producing instrumentality.

The embodiments of Figs. 1, 2 and 3 provide for the regulation of the A.C. voltage across lines 2 and 4, those lines being connected to any appropriate load. The voltage is supplied by an alternator 6 the field windings 8 of which are energized by an exciter 10 having a field 12, a variable impedance 14 in the form of a resistor being connected in series with the field 12. Since the invention is here specifically disclosed in connection with the use of a regulating instrument such as that disclosed in Cohen Patent 2,650,957, manufactured and sold by the assignee of the instant invention under the trade name "Regohm," the variable resistance 14 is shown as provided with a plurality of flexible contact fingers 16 normally engaging and making contact with a shorting bar 18. The fingers 16 are adapted to be sequentially lifted from the shorting bar 18, thus increasing the value of the resistance 14 inserted in series with the exciter field winding 12, in accordance with the energization of an electromagnet having an actuating element in the form of coil 20, the operative connection between the coil 20 and the fingers 16 being represented by the broken line 22. The coil 20 is provided with direct current by means of the full wave rectifier bridge 23 connected between the lines 2 and 4 in series with the adjusting rheostat 24, and consequently acts to sense the voltage across the lines 2 and 4 and to vary the effective value of the resistance 14 in accordance therewith. The setting of the rheostat 24 will control the nominal value of the voltage across the lines 2 and 4 which the system will maintain.

In order to provide additional gain to the regulating system, a second electromagnet-actuating element in the form of coil 26 is employed, that coil being connected across the full wave rectifier bridge 28 in series with a saturable diode 30 which, in known manner, functions as a gain-producing instrumentality. The top and bottom of the bridge 28 are connected to the lines 2 and 4 respectively. One end of the coil 26 is connected to one side of the bridge 28, the other end of the coil 26 is connected to the anode 31 of the diode 30, and the cathode 33 of the diode 30 is connected to the other side of the bridge 28. The cathode is energized by means of a step-down transformer 32 connected across the lines 2 and 4 in series with variable rheostat 34. The setting of rheostat 34 will control the amount of gain produced by the diode 34 by controlling the heating of its cathode and consequently the supply of electrons which may pass from the cathode to the anode and then through the electromagnet-actuating coil 26. The operative connection between the coil 26 and the contact fingers 16 is represented by the broken line 36.

The system of Fig. 1 has the grave disadvantage that failure of the diode 30 completely destroys the operability of the overall system from a practical point of view. The magnitude of the effect of the malfunction of the diode 30 can be appreciated from the following analysis:

The fingers 16 are controlled in accordance with the total number of ampere turns in the electromagnet operatively active on those fingers. Those ampere turns are made up of the ampere turns in coil 20 and the ampere turns in coil 26. Algebraically, this may be represented as follows:

$NI = N_1I_1 + N_1I_2$, where
$N$ = total equivalent number of turns,
$I$ = equivalent current passing through both coils,
$N_1$ = number of turns in coil 20,
$I_1$ = current in coil 20,
$N_2$ = number of turns in coil 26, and
$I_2$ = current in coil 26.

From this it follows that $$V' = \frac{NI}{N_1I_1} \times V$$

where $V$ = the regulated voltage when the diode 30 is functioning, and
$V'$ = the regulated voltage when the diode 30 is not functioning.

If we assume that NI equals 350 ampere turns, distributed 250 ampere turns in coil 20 and 100 ampere turns in coil 26 during normal operation of the system, and that regulation normally occurs at 115 volts, then failure of the diode 30 will make $V' = 160$ volts. Clearly the difference between $V'$ and $V$ is excessive.

However, if a normally non-acting element such as the voltage regulating tube 38 be connected across the diode 30, as in Fig. 2, a completely different situation will result. The voltage regulating tube 38 may be of the type which will pass current when the voltage thereacross is 105 volts. The voltage normally across the diode 30 may be 90 volts. The effect of the voltage regulating tube 38, upon failure of the diode 30, can be demonstrated according to the following analysis:

As before, $$NI = N_1I_1 + N_2I_2$$

From this it follows that $$NI = N_1\frac{V}{R_1} + N_2\left(\frac{kV - Vd}{R_2}\right)$$

where $V$ = the regulated voltage with the diode operating,
$R_1$ = the apparent resistance, as between lines 2 and 4, of rheostat 24, bridge 20 and coil 20,
$kV$ = the voltage applied between the cathode 33 of the diode 30 and the left hand end of the coil 26,
$Vd$ = the voltage drop across the diode 30, and
$R_2$ = the resistance of coil 26.

When the diode fails, $$NI = N_1 \frac{V'}{R_1} + N_2 \left( \frac{kV' - V_{vr}}{R_2} \right)$$

where $V'$=the voltage across lines 2 and 4 after the diode 30 has failed, and
$V_{vr}$=the voltage across the tube 8.

Assuming the following values:
$V$=115 volts
$N_1$=250 turns
$R_1$=150 ohms
$N_2$=10,000 turns
$R_2$=4800 ohms
$k$=1.2
$V_d$=90
$V_{vr}$=105, and solving for $V'$, we find that $V'$=122 volts.

Thus, the addition of the voltage regulating tube 38 has resulted in an increase in regulated voltage of only 7 volts upon failure of the diode 30, as compared with an increase of 46 volts without the voltage regulator tube 38.

The tube performs another function. Should the load across the lines 2 and 4 suddenly be dumped, a very high transient voltage may appear across the lines 2 and 4. This voltage may be sufficient to cause the tube 38 to conduct, and as a result a current will flow through the coil 26 which is in excess of the maximum current permitted by the saturable diode 30. The electromagnetic action effective on the fingers 16 will therefore be greater than that which would occur had the tube 38 been absent, and the control system will respond more rapidly to bring the voltage back to its nominal value. As soon as the voltage has come close enough to its nominal value so that the voltage drop across the tube 38 is less than 105 volts, that tube will become non-conductive, only the diode 30 will remain active, and the system will then operate in its normal manner.

Fig. 3 differs from Fig. 2 in that coil 40 and rheostat 42 are connected in series with the voltage regulating tube 38 and across the diode 30. The coil 40 constitutes a third electromagnet-actuating element in the form of a coil, and its operative connection to the fingers 16 is represented by the broken line 44.

One function of the coil 40 is to increase the speed of response of the system when the tube 38 becomes conductive, as when the voltage being regulated departs radically from its nominal value, since the current flowing through the tube 38 energizes the coil 40 in addition to the coil 26, whereas the current flowing through the diode 30 energizes only the coil 26.

The more important function of the coil 40 is to permit the system to hold the regulated voltage at its nominal value even though the diode 30 should become inoperative. This may be demonstrated by the following analysis:

Before the diode 30 fails, as before, $NI = N_1I_1 + N_2I_2$. After the diode fails
$NI = N_1I_1 + N_2I_3 + N_3I_3$, or
$NI = N_1I_1 + (N_2+N_3)I_3$, where
$N_3$ and $I_3$ represent respectively the number of turns in coil 40 and the current flowing through the coil 40 after failure of the diode 30.

$$I_3 = \frac{kV' - V_{vr}}{R_2 + R_3}$$

where $R_2$=the resistance of coil 26, and
$R_3$=the combined resistance of the coil 40 and the rheostat 42.

Since we are designing a circuit in which $V'$, the voltage upon the failure of the diode 30, equals $V$, the regulated voltage before failure, and substituting in the last equation for $NI$, $$NI = \frac{VN_1}{R_1} + (N_2+N_3)\left(\frac{kV - V_{vr}}{R_2+R_3}\right)$$

Substituting now the same values as were substituted above in connection with the analysis of the circuit of Fig. 2, $$350 = 250 + (10{,}000+N)\left(\frac{138-105}{4800+R_3}\right)$$

or $$R_3 = \frac{N_3}{3} - 1467$$

Hence if coil 40 be given 10,000 turns, it should have, for its resistance, some value less than 1866 ohms. Adjustment of the rheostat 42 can bring the overall value of $R_3$ to 1866 ohms, and consequently upon failure of the diode 30, the voltage across lines 2 and 4 will still be maintained, at 115 volts. The system will not be quite as effective as it was before the diode 30 failed. It will not be as sensitive, will not have as great a speed of response. It therefore will take the system somewhat longer to achieve regulation of the voltage at its nominal value than would be the case if the diode 30 were functioning properly. Nevertheless it will function in a manner satisfactory at least for emergency operation.

It will be understood that the specific values assumed in the above examples have been chosen merely for illustrative purposes, and that design of an actual system for optimum performance may involve numerous other considerations.

Figure 4:
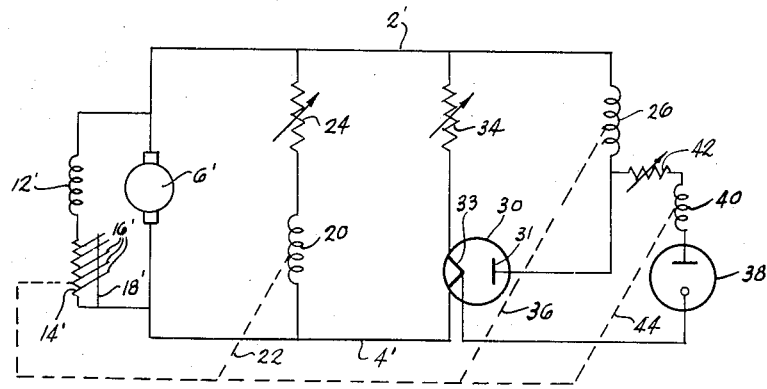
Fig. 4 is a circuit diagram similar to Fig. 3 but disclosing the invention applied to a D.C. system.

The system disclosed in Fig. 4 illustrates the present invention as applied to the control of the voltage output from a D.C. generator 6' having a field winding 12' connected in series with the variable impedance 14'. Since the voltage across the lines 2' and 4' is D.C., the electromagnet actuating coil 20 is connected directly across the lines in series with the rheostat 24. The cathode 33 of the diode 30 is connected directly across the line in series with the rheostat 34. The second voltage regulating coil 26 is connected between the anode 31 of the diode 30 and the high potential line 2'. The voltage regulating tube 38 is connected between the cathode 33 of the diode 30 and a point between the coil 26 and the anode 31 of the diode 30, the coil 40 and rheostat 42 being connected in series with the voltage regulating tube 38. If the voltage output from the generator 6' should be insufficient to provide proper plate voltages to the tubes 30 and 38, that plate voltage could nevertheless be provided in conventional manner by interposing a chopper, transformer and rectifier between the tubes and the voltage output from the generator 6'.

In accordance with the present invention a regulating system can be devised having a degree of sensitivity corresponding with the response characteristic of the overall system being controlled so that optimum regulation may be achieved, the sensitivity of the system may increase in the event of radical departures of the controlled parameter from nominal value, thus greatly increasing the speed of response of the system in such an instance, and the system may be so designed that it will fail safe, failure of malfunction of the sensitivity-imparting instrumentalities resulting in regulation at or close to the nominal value of the parameter concerned.

While but a limited number of specific embodiments of the present invention have been here disclosed utilizing but one of many possible types of control units, and illustrated as controlling only two of an almost infinite number of different systems, it will be apparent that many variations may be made therein, all within the scope of the instant invention as defined in the following claims.

We claim:

1. In an electrical system comprising a variable impedance the value of which is varied in accordance with variations of a selected sensed electrical condition in said system by the energization of a plurality of actuating elements acting together, said actuating elements being operatively connected to said variable impedance; the improvement which comprises means for energizing one of said elements in accordance with said selected electrical condition, means for energizing another of said elements via an auxiliary circuit device in accordance with said selected electrical condition, and a normally inactive circuit element connected across said auxiliary circuit device and becoming active only when the voltage thereacross exceeds the voltage normally thereacross when said selected electrical condition is at a predetermined value.

2. In the system of claim 1, a third actuating element operatively connected to said variable impedance and energized by said normally inactive circuit element when it becomes active.

3. In an electrical system comprising a variable impedance the value of which is varied in accordance with variations of a selected sensed electrical condition in said system by the energization of a plurality of actuating elements acting together, said actuating elements being operatively connected to said variable impedance; the improvement which comprises means for energizing one of said elements in accordance with said selected electrical condition, means for energizing another of said elements via an auxiliary circuit device in accordance with said selected electrical condition, and a normally non-conductive circuit element connected across said auxiliary circuit device and effective to pass current only when the voltage thereacross exceeds the voltage normally thereacross when said selected electrical condition is at a predetermined value.

4. In the system of claim 3, a third actuating element operatively connected to said variable impedance and in series with said normally non-conductive circuit element and across said auxiliary circuit device.

5. The system of claim 4, in which said auxiliary circuit device is an electron tube.

6. The system of claim 4, in which said normally non-conductive circuit element is a voltage regulator tube.

7. The system of claim 3, in which said auxiliary circuit device is an electron tube.

8. The system of claim 3, in which said normally non-conductive circuit element is a voltage regulator tube.

9. In the system of claim 4, a variable resistor in series with said third actuating element and across said auxiliary circuit device.

10. In an electrical system comprising a variable impedance the value of which is varied in accordance with variations of a selected sensed electrical condition in said system by the energization of a plurality of actuating elements acting together, said actuating elements being operatively connected to said variable impedance; the improvement which comprises means for energizing one of said elements in accordance with said selected electrical condition, means for energizing another of said elements via an auxiliary circuit device in accordance with said selected electrical condition, a normally inactive circuit element connected across said auxiliary circuit device, a third actuating element operatively connected to said normally inactive circuit element and energized thereby when said normally inactive circuit element becomes active, and means sensitive to said selected electrical condition and to the condition of said auxiliary circuit device for causing said normally inactive circuit element to become active upon the existence of a predetermined value of said selected electrical condition.

11. The system of claim 10, in which said auxiliary circuit device is an electron tube.

12. The system of claim 10, in which said normally inactive circuit element is a voltage regulator tube.

13. In an electrical system comprising a variable impedance the value of which is varied in accordance with variations of a selected sensed electrical condition in said system by the energization of an electromagnet having a pair of actuating coils; the improvement which comprises means for energizing one of said coils via an auxiliary circuit device in accordance with said selected electrical condition, and a voltage regulating tube connected in series with the other of said coils across said auxiliary circuit device and effective to pass current only when the voltage thereacross exceeds the voltage normally across said auxiliary circuit device when said selected electrical condition is at a predetermined value.

14. In the system of claim 13, a variable resistor in series with said other of said coils and across said auxiliary circuit device.

15. The system of claim 14, in which said auxiliary circuit device is an electron tube.

16. The system of claim 13, in which said auxiliary circuit device is an electron tube.

References Cited in the file of this patent

UNITED STATES PATENTS

| | | |
|---|---|---|
| 1,845,896 | Voohoeve | Feb. 16, 1932 |
| 2,313,957 | Myers | Aug. 2, 1940 |
| 2,469,280 | Scott | May 3, 1949 |
| 2,508,166 | Jolly | May 16, 1950 |
| 2,593,350 | Seybold | Apr. 15, 1952 |